3,423,462
HYDROGENATION OF NITROPHENYL ALKYL KETONES

Paul N. Rylander, Newark, N.J., assignor to Engelhard Industries, Inc., Newark, N.J., a corporation of Delaware
No Drawing. Filed Dec. 10, 1965, Ser. No. 513,087
U.S. Cl. 260—580
Int. Cl. C07c 85/10
2 Claims

ABSTRACT OF THE DISCLOSURE

Nitrophenyl alkyl ketones are selectively hydrogenated to aminophenyl alkyl ketones over palladium on calcium carbonate catalyst.

---

This invention relates to a process for catalytic hydrogenation and is particularly concerned with a process for the catalytic hydrogenation of nitrophenyl alkyl ketones to produce aminophenyl alkyl ketones.

Heretofore, it has been proposed to catalytically hydrogenate nitrophenyl alkyl ketones such as meta-nitroacetophenone by the use of metal hydrogengation catalysts of Group VIII of the Periodic Table, such as Raney nickel, platinum oxide, palladium and the like. It is well known that palladium is an exceptionally active catalyst for hydrogenating the aromatic nitro group to the amine, and that palladium is also extremely active for the reduction of an aromatic carbonyl group to the alcohol.

In the catalytic reduction of nitrophenyl alkyl ketones to produce amino phenyl alkyl ketones, 3 moles of hydrogen are absorbed, and unless the activity of the active palladium catalyst is attenuated, and the hydrogenation carefully controlled, the hydrogenation proceeds rapidly to the point of absorption of 4 moles of hydrogen with the production of aminophenyl alkyl carbinols, rather than the desired ketone. In large scale reactors, it is difficult to control the hydrogen uptake, and therefore it is desirable to employ a catalyst exhibiting a sharp difference in the rate of hydrogen uptake between these reactions.

In accordance with the present invention, nitrophenyl alkyl ketones are catalytically hydrogenated to the corresponding aminophenyl ketone by treating the nitro compound with hydrogen in the presence of a catalyst comprising palladium supported on calcium carbonate. The utilization of calcium carbonate as the support provides a rapid rate of hydrogenation for the conversion of the nitrophenyl alkyl ketone to the corresponding amine, while having relatively low activity for the conversion of the ketone group to the alcohol group.

Any nitrophenyl alkyl ketone may be hydrogenated according to the process of this invention. Typical feed stocks which can be employed include nitroacetophenone, such as meta-nitroacetophenone which is hydrogenated to meta-aminoacetophenone, para-nitropropiophenone, or tho-nitrobutyrophenone, or the like. Generally, suitable feedstocks include compounds having the formula

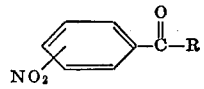

wherein R is an alkyl group having from 1 to 8 carbon atoms.

The catalyst which is employed comprises palladium supported on calcium carbonate, which is a known hydrogenation catalyst and can be prepared by methods well known to the art. In the process of the present invention, the catalyst may contain from 0.1 to 10% active metal by weight, and is employed in an amount of from 0.05 to about 10% by weight based on the weight of nitro-ketone being treated.

The reaction temperatures for the hydrogenation may be from 0° to 150° C., preferably from about 20° C. to about 50° C.; the pressure during the hydrogenation may be from 0.2 to 200 atmospheres, preferably from about 1 to about 2 atmospheres, and the process may be batch or continuous.

The hydrogenation is normally effected by dissolving the nitro-ketone in a solvent, and bubbling hydrogen through the solution or agitating the same under hydrogen pressure in a suitable hydrogenation apparatus. The usual solvents employed in hydrogenation, e.g. alcohol, benzene, dimethylformamine, hexane, butanol and the like may be employed.

Hydrogenation is effected until 3 moles of hydrogen are absorbed per mole of nitrophenyl alkyl ketone treated, and the product recovered by recrystallization from the solution, or evaporation of the solvent, followed by recrystallization of the residue so obtained from suitable solvents, distillation, or the like.

The invention will be further illustrated by reference to the following example:

EXAMPLE

A 1,000 ml. flask was charged with 1.0 g. meta-nitroacetophenone, 100 mg. of catalyst and 50 ml. of ethanol, and hydrogen at atmospheric pressure. The flask was vigorously shaken and the rate of hydrogen uptake at constant pressure measured. The average rate for absorption of the first 3 moles of hydrogen and for absorption of the fourth mole of hydrogen was determined. A series of runs was made using palladium catalyst supported on different carriers in each case, as shown in the table. Analysis of the product confirmed that after three moles of hydrogen were absorbed, the product was substantially pure meta-aminoacetophenone. The results of these tests are shown in the table.

TABLE

| Run No. | Catalyst | $H_2$ absorption rate, ml. $H_2$/min. for 1st-3rd moles $H_2$ (A) | $H_2$ absorption rate, ml. $H_2$/min. for 4th mole $H_2$ (B) | Rate, ratio A/B |
|---|---|---|---|---|
| 1 | 5% Pd/carbon | 86 | 10 | 8.6 |
| 2 | 5% Pd/Al$_2$O$_3$ | 62 | 10 | 6.2 |
| 3 | 5% Pd/Mg silicate | 41 | 2.5 | 16 |
| 4 | 5% Pd/SrCO$_3$ | 32 | 5 | 6.4 |
| 5 | 5% Pd/BaCO$_3$ | 35 | 3 | 11.7 |
| 6 | 5% Pd/BsSO$_4$ | 32 | 5 | 5.8 |
| 7 | 5% Pd/CaCO$_3$ | 86 | 2.6 | 33 |

It will be noted from the above table that palladium on calcium carbonate combines a fast rate of hydrogenation for the first three moles of hydrogen absorption, and a slow rate for the fourth mole absorption. The initial rate with calcium carbonate is equal to that obtained with the best other support, carbon, but the rate for the fourth mole of hydrogen absorption is only about 25% that with the carbon supported catalyst. This rate differential makes palladium on calcium carbonate uniquely useful for the partial hydrogenation of nitrophenyl alkyl ketones to the corresponding aminophenyl alkyl ketone.

What is claimed is:

1. A process for the hydrogenation of a nitrophenyl alkyl ketone having the general formula

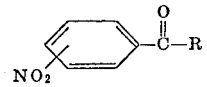

wherein R is an alkyl group having from 1 to about 8 carbon atoms which comprises reacting said ketone with hydrogen in the presence of a catalyst consisting essentially of palladium on calcium carbonate, at a temperature between about 20° C. and 50° C. and a pressure between about 1 and about 2 atmospheres, until 3 moles of hydrogen have reacted per mole of ketone to convert said ketone to aminophenyl alkyl ketone, and separating the hydrogenated product from the reaction mixture.

2. The process of claim 1 wherein the nitrophenyl alkyl ketone is meta-nitroacetophenone.

References Cited

UNITED STATES PATENTS

| 2,797,244 | 6/1957 | Tinsley | 260—580 |
| 3,350,452 | 10/1967 | Rylander et al. | 260—580 |

OTHER REFERENCES

Roberts et al., J.A.C.S., 73, 2509 (1951).

CHARLES B. PARKER, *Primary Examiner.*

PATRICIA C. IVES, *Assistant Examiner.*

U.S. Cl. X.R.

260—690